United States Patent
Spies

(10) Patent No.: US 11,941,846 B2
(45) Date of Patent: Mar. 26, 2024

(54) DEVICE AND METHOD FOR ASCERTAINING THE POSE OF AN OBJECT

(71) Applicant: Robert Bosch GmbH, Stuttgart (DE)

(72) Inventor: Markus Spies, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 163 days.

(21) Appl. No.: 17/677,015

(22) Filed: Feb. 22, 2022

(65) Prior Publication Data

US 2022/0277483 A1 Sep. 1, 2022

(30) Foreign Application Priority Data

Feb. 26, 2021 (DE) .................... 10 2021 201 880.7

(51) Int. Cl.
*G06T 7/73* (2017.01)
*G06T 1/00* (2006.01)
*G06T 17/20* (2006.01)

(52) U.S. Cl.
CPC .............. *G06T 7/75* (2017.01); *G06T 1/0014* (2013.01); *G06T 17/20* (2013.01); *G06T 2207/20081* (2013.01)

(58) Field of Classification Search
CPC ......... G06T 7/75; G06T 1/0014; G06T 17/20; G06T 2207/20081
See application file for complete search history.

(56) References Cited

U.S. PATENT DOCUMENTS

| 2015/0100289 | A1* | 4/2015 | Kimmel | G06T 17/00 703/2 |
| 2022/0020178 | A1* | 1/2022 | Metzler | G06T 7/97 |
| 2022/0277483 | A1* | 9/2022 | Spies | G06T 7/75 |
| 2023/0132479 | A1* | 5/2023 | Karanam | G06T 17/20 345/419 |

* cited by examiner

*Primary Examiner* — Abderrahim Merouan
(74) *Attorney, Agent, or Firm* — NORTON ROSE FULBRIGHT US LLP; Gerard A. Messina

(57) ABSTRACT

A method for ascertaining the pose of an object. The method includes recording a first and a second camera image of the object, ascertaining a correspondence between camera pixels of the camera images and vertices of a 3D model of the object, and ascertaining the pose of the object from a set of poses by minimizing, across the set of poses, a loss function, the loss function for a pose being provided by accumulation of distance measures between projections of the object in the pose onto the respective camera image plane and the corresponding pixels of the respective camera image.

10 Claims, 4 Drawing Sheets

DEVICE AND METHOD FOR ASCERTAINING THE POSE OF AN OBJECT

FIELD

Various exemplary embodiments of the present invention relate in general to a device and to a method for ascertaining the pose of an object.

BACKGROUND INFORMATION

In order to enable a flexible manufacturing or processing of objects by a robot, it is desirable for the robot to be able to manipulate an object regardless of the pose with which the object is placed into the workspace of the robot. The robot should therefore be capable of recognizing which parts of the object are located at which positions, so that it is able, for example, to grip the object at the correct point in order, for example, to fasten it to another object or to weld the object at the present spot. This means that the robot should be capable of recognizing the pose (position and orientation) of the object, for example, from an image that is recorded, for example, by an image attached at the robot. With knowledge of the pose of the camera and of a correspondence between pixels and positions of the object (for example, vertices of a 3D object model), it is possible to deduce the pose of the object. Due to problems such as coverage and symmetries, however, this object is, in general, not easy to achieve. Accordingly, improved approaches for ascertaining the pose of an object are desirable.

SUMMARY

According to various specific embodiments of the present invention, a method is provided for ascertaining the pose of an object, which includes: ascertaining a 3D model of the object, the 3D model including a grid of vertices, recording a first camera image of the object from a first perspective, recording a second camera image of the object from a second perspective, which differs from the first perspective, ascertaining a correspondence between camera pixels of the first camera image and vertices of the 3D model, ascertaining a correspondence between camera pixels of the second camera image and vertices of the 3D model, and ascertaining the pose of the object from a set of poses by minimizing, across the set of poses, a loss function, the loss function for a pose being provided by: projecting vertices of the 3D model into the camera image plane according to the first perspective, in the event that the 3D model is situated in the pose, projecting vertices of the 3D model into the camera image plane according to the second perspective in the event that the 3D model is situated in the pose, calculating distance measures between the projections of the vertices projected according to the first perspective and the camera pixels of the first camera image, which are assigned to vertices projected according to the first perspective, calculating distance measures between the projections of the vertices projected according to the second perspective and the camera pixels of the second camera image, which are assigned to the vertices projected according to the second perspective, and accumulating the calculated distance measures to the loss function.

The above-described method enables an improved ascertainment (or estimation) of the pose of an object and, accordingly, a safer handling of an object by a robot since, for example, the incorrect ascertainment of the pose of the object and an incorrect gripping or handling (painting, welding, etc.) at an incorrect (sensitive) point may be avoided.

Exemplary embodiment 1 is a method for ascertaining the pose of an object as described above.

Exemplary embodiment 2 is the method according to exemplary embodiment 1, the ascertainment of the correspondence between camera pixels of the first camera image and vertices of the 3D model and the ascertainment of the correspondence between camera pixels of the second camera image and vertices of the 3D model taking place by mapping camera pixels of the first camera image and of the second camera image onto respective descriptor values and by assigning to the camera pixels vertices of the 3D model, to which the respective descriptor values are assigned.

The mapping of pixels onto descriptor values (i.e., the mapping of the camera images onto descriptor images) enables the detection of the structure (for example, the topology) of the object regardless of the pose of the object and thus the assignment of camera pixels to 3D model vertices.

Exemplary embodiment 3 is the method according to exemplary embodiment 2, the mapping taking place using a machine learning model, which is trained using the 3D model and the descriptor values assigned to the vertices of the 3D model.

A machine learning model such as, for example, a neural network, may be effectively trained for ascertaining descriptor values. One example thereof is dense object net.

Exemplary embodiment 4 is the method according to one of exemplary embodiments 1 through 3, including recording a plurality of camera images of the object, each camera image of the plurality of camera images being recorded from one perspective each of a plurality of perspectives differing pairwise, ascertaining, for each camera image of the plurality of camera images, a correspondence between camera pixels of the first camera image and vertices of the 3D model, and ascertaining the pose of the object from a set of poses by minimizing, across the set of poses, a loss function, the loss function for a pose being provided by:

for each camera image of the plurality of camera images, projecting vertices of the 3D model into the camera image plane according to the respective perspective, in the event the 3D model is situated in the pose;

for each camera image of the plurality of camera images, calculating distance measures between the projections of the vertices projected according to the respective perspective and the camera pixels of the camera image, which are assigned to the vertices projected according to the respective perspective;

and accumulating the calculated distance measures to the loss function.

By using more than two camera images for estimating the object pose, it is possible to further enhance the accuracy of the estimate.

Exemplary embodiment 5 is a method for controlling a robot, which includes the following: ascertaining the pose of an object according to one of exemplary embodiments 1 through 4 and controlling the robot as a function of the ascertained pose of the object.

Exemplary embodiment 6 is the method according to exemplary embodiment 5, the determination of the pose of the object including the determination of the position of a particular part of the object, and the control of the robot as a function of the ascertained pose of the object including controlling an end effector of the robot to move to the position of that part of the object and to interact with that part of the object.

Exemplary embodiment 7 is a software agent or hardware agent, in particular, a robot, which includes the following: a camera, which is configured to record camera images of an object; and a control unit, which is configured to carry out the method according to one of exemplary embodiments 1 through 6.

Exemplary embodiment 8 is the software agent or hardware agent according to exemplary embodiment 7, which includes at least one actuator, the control unit being configured to control the at least one actuator as a function of the ascertained pose of the object.

Exemplary embodiment 9 is a computer program, which includes instructions which, when executed by a processor, prompt the processor to carry out a method according to one of exemplary embodiments 1 through 6.

Exemplary embodiment 10 is a computer-readable medium, which stores instructions which, when executed by a processor, prompt the processor to carry out a method according to one of exemplary embodiments 1 through 6.

BRIEF DESCRIPTION OF THE DRAWINGS

Exemplary embodiments of the present invention are represented in the figures and are explained in greater detail below. In the figures, identical reference numerals everywhere in the multiple views refer in general to the same parts. The figures are not necessarily true to scale, the emphasis instead being placed in general on the representation of the principles of the present invention.

DETAILED DESCRIPTION OF EXAMPLE EMBODIMENTS

The various specific embodiments of the present invention, in particular, the exemplary embodiments described below, may be implemented with the aid of one or of multiple circuits. In one specific embodiment, a "circuit" may be understood to mean any type of logic-implemented entity, which may be hardware, software, firmware or a combination thereof. Thus, in one specific embodiment, a "circuit" may be a hardwired logic circuit or a programmable logic circuit such as, for example, a programmable processor, for example, a microprocessor. A "circuit" may also be software that is implemented or executed by a processor, for example, any type of computer program. In accordance with one alternative specific embodiment, any other type of implementation of the respective functions described in greater detail below may be understood to be a "circuit."

Figure 1:
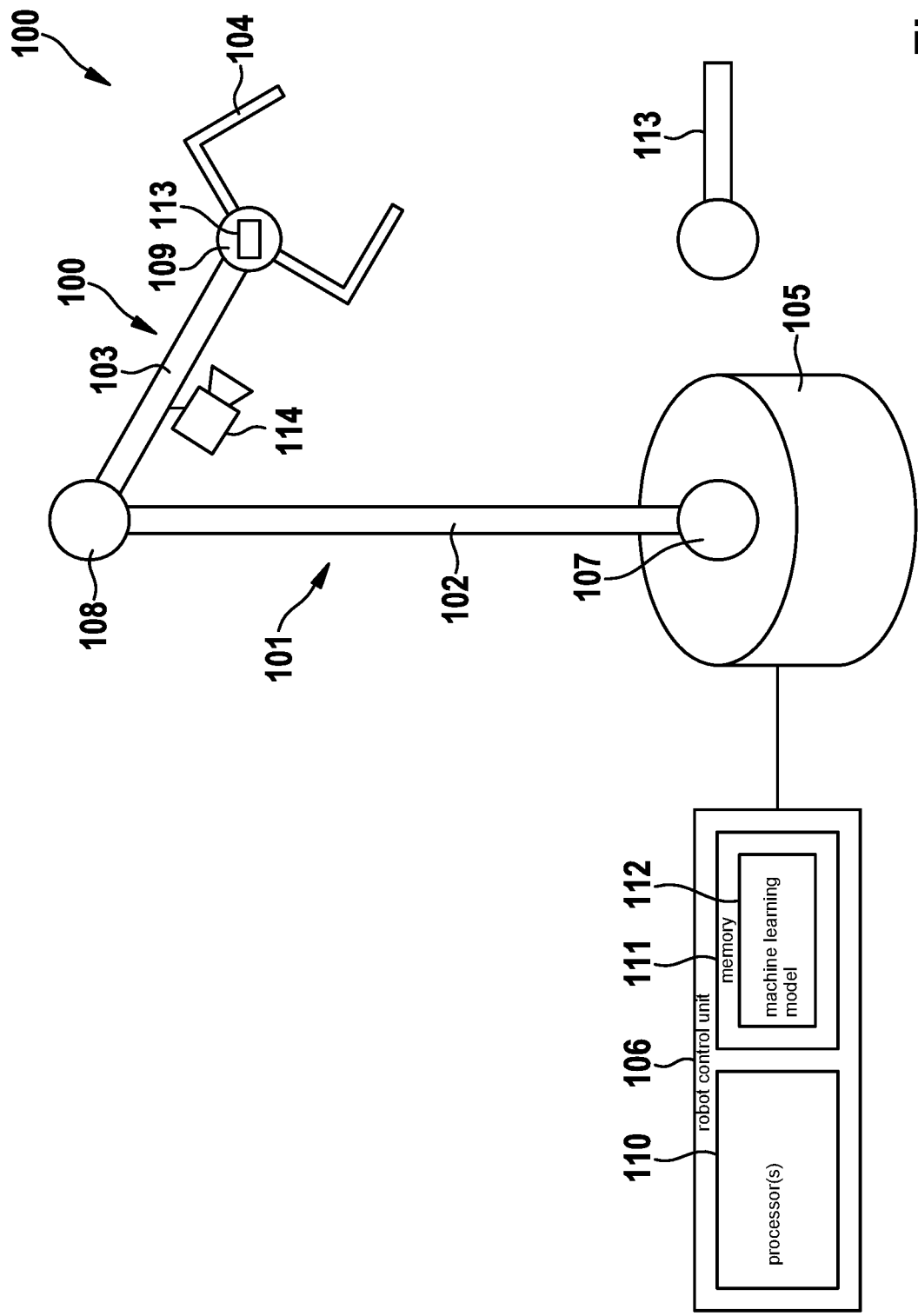
FIG. 1 shows a robot in accordance with an example embodiment of the present invention.

FIG. 1 shows a robot 100.

Robot 100 includes a robotic arm 101, for example, an industrial robotic arm for manipulating or mounting a workpiece (or one or multiple other objects). Robotic arm 101 includes manipulators 102, 103, 104 and a base (or support) 105, with the aid of which manipulators 102, 103, 104 are supported. The term "manipulator" refers to the moveable components of robotic arm 101, the actuation of which enables a physical interaction with the surroundings in order, for example, to carry out a task. For controlling, robot 100 includes a (robot) control unit 106, which is designed for implementing the interaction with the surroundings according to a control program. Last component 104 (which is furthest away from base 105 in the kinematic chain) of manipulators 102, 103, 104 is also referred to as end effector 104 and may include one or multiple tools such as, for example, a welding torch, a gripping instrument, a painting device or the like.

Other manipulators 102, 103 (situated closer to base 105) may form a positioning device so that, together with end effector 104, robotic arm 101 is provided with end effector 104 at its end. Robotic arm 101 is a mechanical arm, which is able to provide functions similar to a human arm (possibly with a tool at its end).

Robotic arm 101 may include joint elements 107, 108, 109, which connect manipulators 102, 103, 104 to one another and to base 105. A joint element 107, 108, 109 may include one or multiple joints, each of which is able to provide a rotatable movement (i.e., rotational movement) and/or a translational movement (i.e., displacement) for associated manipulators relative to one another. The movement of manipulators 102, 103, 104 may be initiated with the aid of actuators, which are controlled by control unit 106.

The term "actuator" may be understood to mean a component, which is designed to trigger a mechanism or process in response to its drive. The actuator is able to implement instructions created by control unit 106 (the so-called activation) into mechanical movements. The actuator, for example, an electromechanical converter, may be designed to convert electrical energy into mechanical energy in response to its drive.

The term "control unit" may be understood to mean an arbitrary type of logic-implemented entity, which may include, for example, a circuit and/or a processor, which is/are able to execute software, firmware or a combination thereof stored in a memory medium, and is able, for example, to issue the instructions/instructions, in the present example, to an actuator. The control unit may, for example, be configured by program code (for example, software) in order to control the operation of a system, in the present example, a robot.

In the present example, control unit 106 includes one or multiple processors 110 and one memory 111, which stores code and data, on the basis of which processor 110 controls robotic arm 101. According to various specific embodiments, control unit 106 controls robotic arm 101 on the basis of a machine learning model 112, which is stored in memory 111.

To manipulate (for example, to grip) an object 113, which is placed, for example, in a workspace of robotic arm 101, control unit 106 ascertains the pose (position and orientation) of object 113. As a function of the ascertained pose, control unit 106 is able to decide, for example, which part of object 113 should be gripped by end effector 109.

Control unit 106 ascertains the pose using camera images of object 113. Robot 100 may, for example, be equipped with one or with multiple cameras 114, which enable it to record images of its workspace. Camera 114 is attached, for example, at robotic arm 101 so that the robot is able to record images of object 113 from various perspectives by moving robotic arm 101 around. However, one or multiple fixed cameras may also be provided.

Machine learning model 112 is, for example, a (deep) neural network, which generates a feature map for a camera image, for example, in the form of an image in a feature space, which makes it possible to assign points in the (2D) camera image to points of the (3D) object.

For example, machine learning model 112 may be trained to assign a particular corner of the object a particular (unique) feature value (also referred to as descriptor value) in the feature space. If machine learning model 112 is then fed a camera image and machine learning model 112 assigns this feature value to a point of the camera image, then it may be concluded that the corner is located at this point (i.e., at a point in space whose projection onto the camera plane corresponds to the point in the camera image). Thus, if the position of multiple points of the object in the camera image is known (in other words, the assignment of pixels to points, for example, vertices, of the object), it is possible to ascertain the pose of the object in space (the so-called 6D pose), for example, by using a PnP (perspective-n-point) resolution method. In this method, as is customary in conjunction with 3D models, the grid points of a 3D object model are referred to as "vertices" (singular "vertex").

The PnP problem is the problem of ascertaining a 6D pose (i.e., position and orientation) of an object from a 2D image if the assignment between points of the 2D representation of the object in the 2D image and points (typically vertices) of the 3D object is known.

Figure 2:
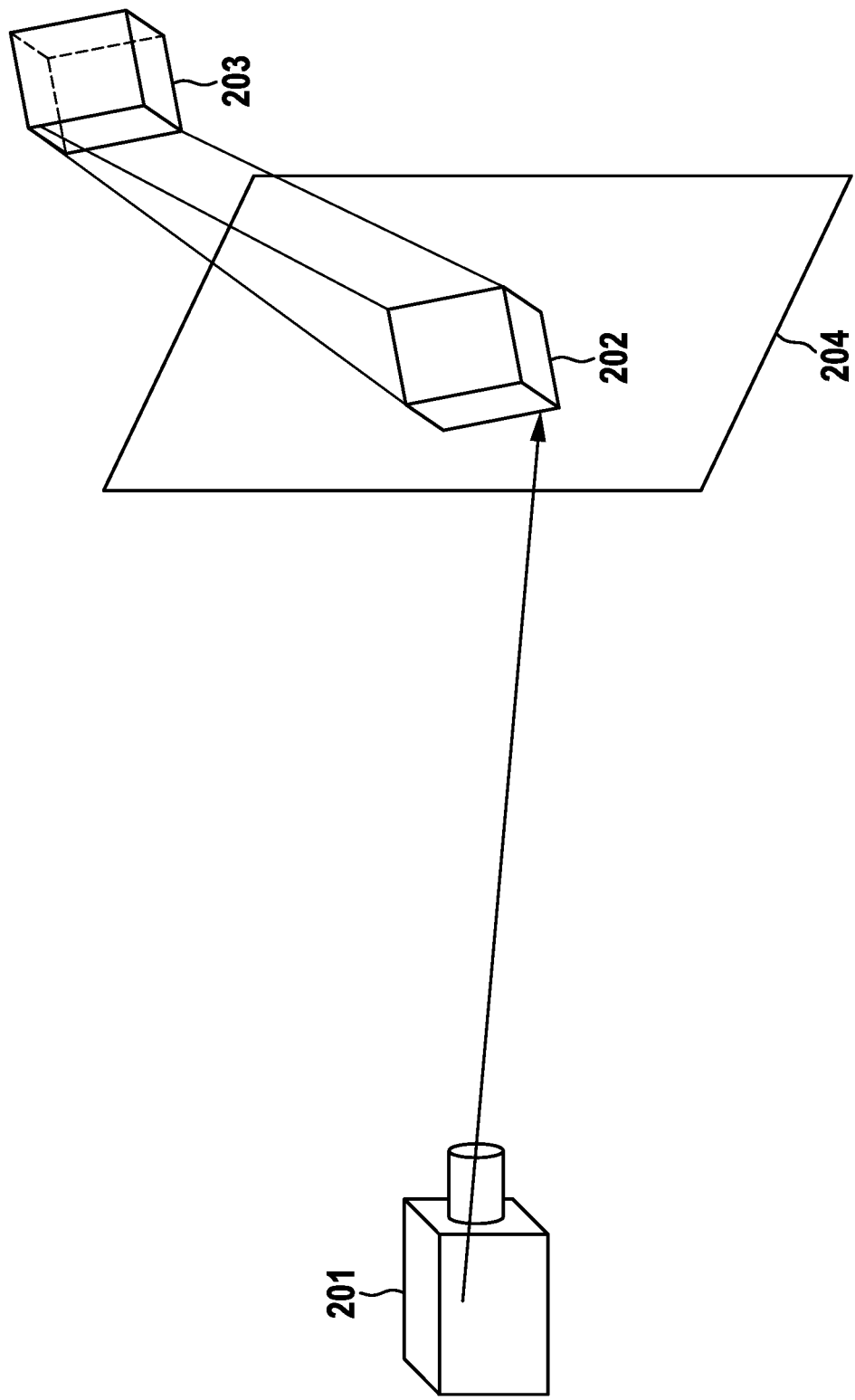
FIG. 2 illustrates the ascertainment of the pose of an object from a camera image of the object, in accordance with an example embodiment of the present invention.

FIG. 2 illustrates the PnP problem.

A camera 201 records an image 202 of a cube 203. Cube 203 is thus projected onto camera image plane 204. Assuming that the corners of the cube are distinct (because they have different colors, for example), the assignment between the vertices of the 3D model (i.e., CAD model) of cube 203 and the pixels in image 202 may be specified. The PnP problem is to ascertain the pose of camera 201 relative to object 203 or, equivalently, the pose of object 203 relative to camera 201 (depending on which coordinate system is used as a reference).

The approach of the PnP problem requires assigning points in 2D object image 202 to 3D object points (for example, vertices of the 3D model). In order to obtain this, a machine learning model may be used as explained above, which assigns descriptor values to points in 2D object image 202, it being known which 3D object points have which descriptor values, which makes the assignment possible.

One example of a machine learning model 112 for object recognition is a dense object network. A dense object network maps an image (for example, an RGB image provided by a camera 114) onto an arbitrary dimensional (dimension D) descriptor space image. Other machine learning models 112 may, however, also be used, in particular, those which do not necessarily generate a "dense" feature map, but merely assign descriptor values to particular points (for example, corners) of the object.

If control unit 106 has ascertained the assignment of pixels of object image 202 and vertices of the 3D model (with the aid of a machine learning model 112 or in some other manner), it is now able to calculate the pose of the object by solving $$\min_{\{R,T\}} \sum_i L(f(y_i, R, T), x_i)$$

where $y_i$ are points of the 3D model, $x_i$ are the associated 2D pixels, f is the projection of 3D pixels onto camera image plane 204 given orientation R, and position T (for example, as a rotation and translation starting from a standard pose) and L are a distance, i.e., a distance measure (according to a metric, for example, the Euclidean metric or maximum metric), between two points in camera image plane 204.

This problem may be solved using various methods (solvers).

According to various specific embodiments, the ascertainment of the object pose such as, for example, as described above, is expanded to an arrangement, in which two (or more) camera images from different perspectives are available (i.e., for example, a stereo arrangement).

Camera images from different positions may be generated by multiple cameras (with different poses) or also by one camera, which is moved between various poses (for example, a camera that is attached to robotic arm 101).

The assignment between 2D pixels and 3D model points (for example, vertices) may be ascertained per camera image as for a single camera image, for example, as described above with the aid of a machine learning model 112, for example, with the aid of a corresponding trained neural network. An arbitrary method, which ascertains an assignment of 2D pixels to 3D object points and an arbitrary PnP resolution method may be expanded by adding a second (or also multiple) camera images from other perspectives.

The use of multiple camera images significantly improves the estimate of the object pose compared to the use of a single image. According to various specific embodiments, two RBG images, for example, are used for estimating an object pose.

One example is described in greater detail below, in which two camera images of an object from different perspectives are used. This may be extended by an analogical extension (such as from one camera image to two camera images) to three or more camera images from different perspectives.

In the case of two camera images (a left image and a right image), the object pose is ascertained, instead of the above formula, by solving $$\min_{\{R,T\}}(\Sigma_i L(f(y_i^l,R,T),x_i^l)+\Sigma_i L(f(y_i^r,R+R',T+T'),x_i^r)$$

where $y_i^l$ are the points of the 3D model with associated pixels $x_i^l$ in the left camera image, the $y_i^r$ are the points of the 3D model with associated pixels $x_i^r$ in the right camera image, as above, f is the projection of 3D pixels onto camera image plane 204 given orientation R and the position T or R+R' and T+R' and as above L are a distance (i.e., a distance measure) between two points in camera image plane 204.

R' and T' indicate the pose of the left camera relative to the right camera.

Figure 3:
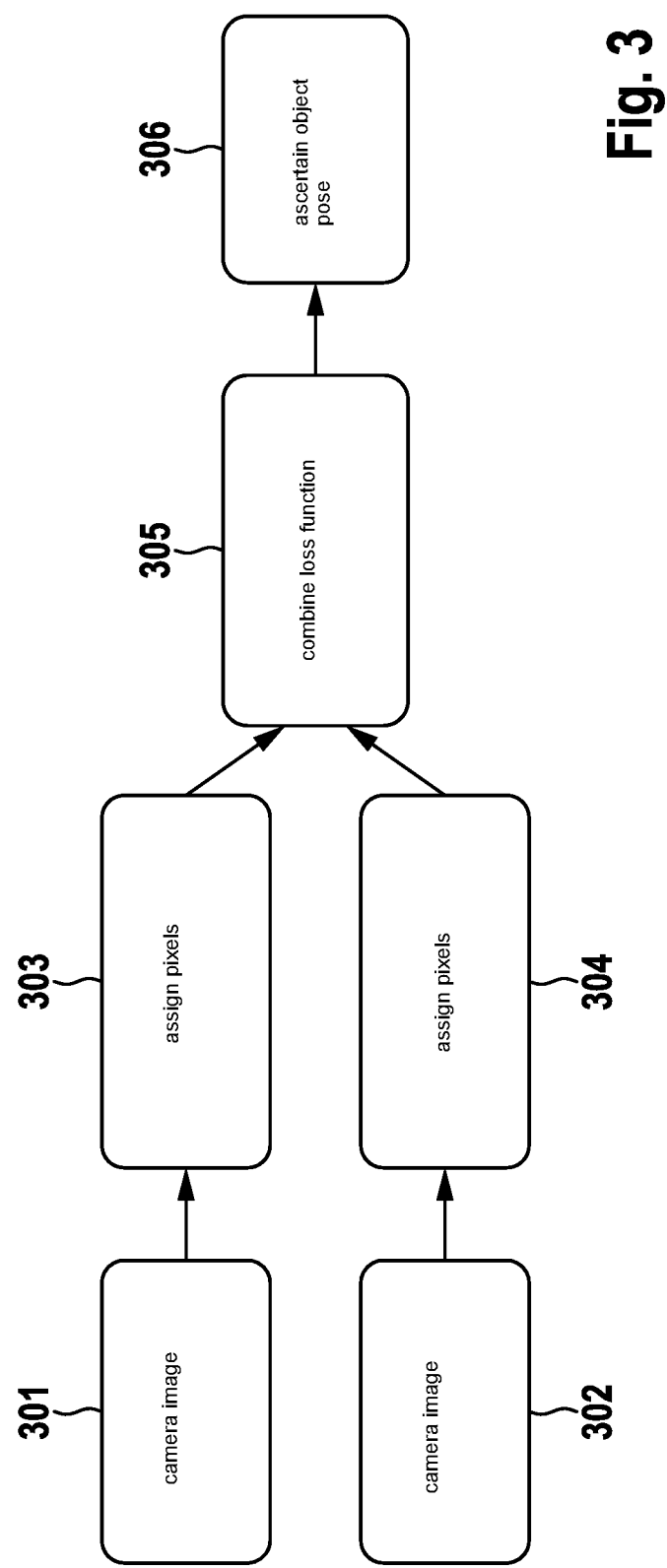
FIG. 3 illustrates the object pose estimate from two camera images according to one exemplary embodiment of the present invention.

FIG. 3 illustrates the object pose estimate from two camera images 301, 302 according to one exemplary embodiment.

Control unit 106 processes both camera images 301, 302 separately with the aid of a pipeline, which calculates respective assignment 303, 304 of 2D pixels and 3D pixels. Control unit 106 ascertains object pose 306 by optimizing combined loss function 305 as indicated above.

In summary, a method according to various specific embodiments is provided, as it is described below with reference to FIG. 4.

Figure 4:
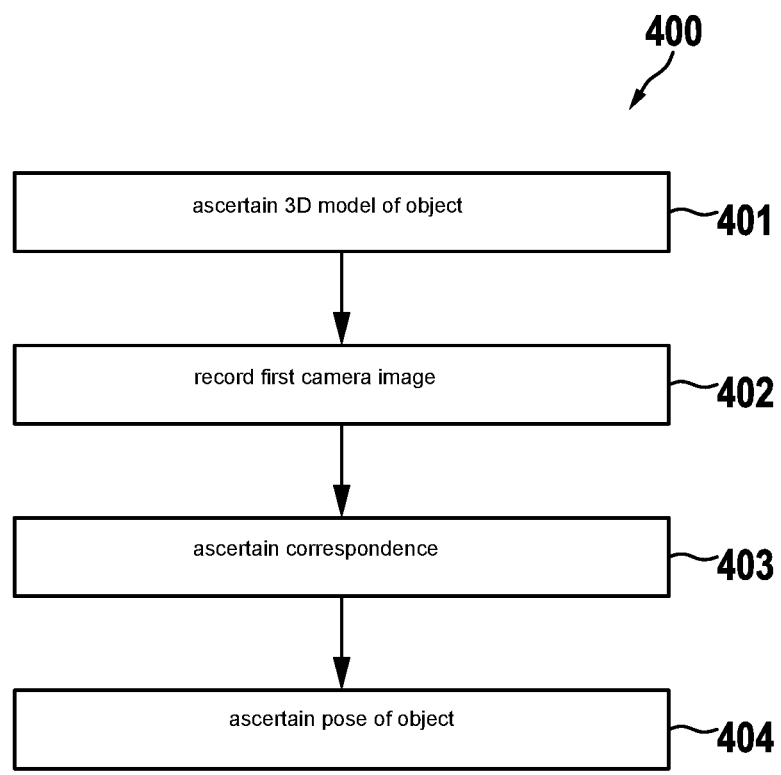
FIG. 4 shows a flowchart for a method for ascertaining the pose of an object according to one specific embodiment of the present invention.

FIG. 4 shows a flowchart 400 for a method for ascertaining the pose of an object.

In 401, a 3D model of the object is ascertained, the 3D model including a grid of vertices.

In 402, a first camera image of the object is recorded from a first perspective and a second camera image of the object is recorded from a second perspective, which differs from the first perspective.

In 403, a correspondence between camera pixels of the first camera image and vertices of the 3D model are ascertained and a correspondence between camera pixels of the second camera image and vertices of the 3D model are ascertained.

In 404, the pose of the object is ascertained from a set of poses by minimizing, across the set of poses, a loss function, the loss function being provided for a pose (or is ascertained, for example, by control unit 106) by:
- projecting vertices of the 3D model into the camera image plane according to the first perspective, in the event that the 3D model is situated in the pose;
- projecting vertices of the 3D model into the camera image plane according to the second perspective, in the event that the 3D model is situated in the pose;
- calculating distance measures between the projections of the vertices projected according to the first perspective and the camera pixels of the first camera image, which are assigned to the vertices projected according to the first perspective;
- calculating distance measures between the projections of the vertices projected according to the second perspective and the camera pixels of the second camera image, which are assigned to the vertices projected according to the second perspective; and
- accumulating the calculated distance measures to the loss function.

According to various specific embodiments, the pose of an object is ascertained from a set of poses by minimizing, across the set of poses, a loss function, the loss function for a pose being provided by accumulation of distance measures between projections of the object in the pose onto the respective camera image plane and the corresponding pixels of the respective camera image.

The camera images are, for example, RBG images, but may, however also be other types of camera images such as depth images or heat images. The object pose is ascertained, for example, by controlling a robot, for example, for assembling a larger object from sub-objects, by moving objects, etc.

"Robot" may be understood to mean any physical system (including a mechanical part whose movement is controlled), such as a computer-controlled machine, a vehicle, a household appliance, a power tool, a manufacturing machine, a personal assistant or an access control system.

The method is computer-implemented according to one specific embodiment.

Although the present invention has been shown and described primarily with reference to particular specific embodiments, it should be understood by those familiar with the technical field that numerous changes thereto with respect to design and details may be undertaken without departing from the essence and scope of the present invention.

What is claimed is:

1. A method for ascertaining a pose of an object, comprising the following steps:
- ascertaining a 3D model of the object, the 3D model including a grid of vertices;
- recording a first camera image of the object from a first perspective;
- recording a second camera image of the object from a second perspective, which differs from the first perspective;
- ascertaining a correspondence between camera pixels of the first camera image and vertices of the 3D model;
- ascertaining a correspondence between camera pixels of the second camera image and vertices of the 3D model; and
- ascertaining the pose of the object from a set of poses by minimizing, across the set of poses, a loss function, the loss function for each pose being provided by:
  - projecting vertices of the 3D model into a respective camera image plane according to the first perspective, in the event that the 3D model is situated in the pose,
  - projecting vertices of the 3D model into a respective camera image plane according to the second perspective, in the event that the 3D model is situated in the pose,
  - calculating distance measures between the projections of the vertices projected according to the first perspective and the camera pixels of the first camera image, which are assigned to vertices projected according to the first perspective,
  - calculating distance measures between the projections of the vertices projected according to the second perspective and the camera pixels of the second camera image, which are assigned to the vertices projected according to the second perspective, and
  - accumulating the calculated distance measures to the loss function.

2. The method as recited in claim 1, wherein the ascertainment of the correspondence between camera pixels of the first camera image and vertices of the 3D model and the ascertainment of the correspondence between camera pixels of the second camera image and vertices of the 3D model take place by mapping camera pixels of the first camera image and of the second camera image onto respective descriptor values and by assigning to the camera pixels vertices of the 3D model, to which the respective descriptor values are assigned.

3. The method as recited in claim 2, wherein the mapping takes place using a machine learning model, which is trained using the 3D model and the descriptor values assigned to the vertices of the 3D model.

4. The method as recited in claim 1, further comprising:
- recording a plurality of camera images of the object, each camera image of the plurality of camera images being recorded from one respective perspective each of a plurality of perspectives differing pairwise,
- ascertaining, for each camera image of the plurality of camera images, a correspondence between camera pixels of the first camera image and vertices of the 3D model; and
- ascertaining the pose of the object from a set of poses by minimizing, across the set of poses, a loss function, the loss function for each pose being provided by:
  - for each camera image of the plurality of camera images, projecting vertices of the 3D model into a respective camera image plane according to the respective perspective, in the event that the 3D model is situated in the pose,
  - for each camera image of the plurality of camera images, calculating distance measures between the projections of the vertices projected according to the respective perspective and the camera pixels of the camera image, which are assigned to the vertices projected according to the respective perspective, and accumulating the calculated distance measures to the loss function.

5. A method for controlling a robot, comprising the following steps:

ascertaining the pose of an object, including:
ascertaining a 3D model of the object, the 3D model including a grid of vertices;
recording a first camera image of the object from a first perspective;
recording a second camera image of the object from a second perspective, which differs from the first perspective;
ascertaining a correspondence between camera pixels of the first camera image and vertices of the 3D model;
ascertaining a correspondence between camera pixels of the second camera image and vertices of the 3D model; and
ascertaining the pose of the object from a set of poses by minimizing, across the set of poses, a loss function, the loss function for each pose being provided by:
projecting vertices of the 3D model into a respective camera image plane according to the first perspective, in the event that the 3D model is situated in the pose,
projecting vertices of the 3D model into a respective camera image plane according to the second perspective, in the event that the 3D model is situated in the pose,
calculating distance measures between the projections of the vertices projected according to the first perspective and the camera pixels of the first camera image, which are assigned to vertices projected according to the first perspective,
calculating distance measures between the projections of the vertices projected according to the second perspective and the camera pixels of the second camera image, which are assigned to the vertices projected according to the second perspective, and
accumulating the calculated distance measures to the loss function; and
controlling the robot as a function of the ascertained pose of the object.

6. The method as recited in claim 5, wherein the determination of the pose of the object includes the determination of the position of a particular part of the object, and the control of the robot as a function of the ascertained pose of the object includes controlling an end effector of the robot to move to the position of the particular part of the object and to interact with the particular part of the object.

7. A software agent or hardware agent, comprising:
a camera configured to record camera images of an object; and
a control unit configured to ascertain a pose of the object, the control unit configured to:
ascertain a 3D model of the object, the 3D model including a grid of vertices;
record a first camera image of the object from a first perspective;
record a second camera image of the object from a second perspective, which differs from the first perspective;
ascertain a correspondence between camera pixels of the first camera image and vertices of the 3D model;
ascertain a correspondence between camera pixels of the second camera image and vertices of the 3D model; and
ascertain the pose of the object from a set of poses by minimizing, across the set of poses, a loss function, the loss function for each pose being provided by:
projecting vertices of the 3D model into a respective camera image plane according to the first perspective, in the event that the 3D model is situated in the pose,
projecting vertices of the 3D model into a respective camera image plane according to the second perspective, in the event that the 3D model is situated in the pose,
calculating distance measures between the projections of the vertices projected according to the first perspective and the camera pixels of the first camera image, which are assigned to vertices projected according to the first perspective,
calculating distance measures between the projections of the vertices projected according to the second perspective and the camera pixels of the second camera image, which are assigned to the vertices projected according to the second perspective, and
accumulating the calculated distance measures to the loss function.

8. The software agent or hardware agent as recited in claim 7, wherein the software agent of the hardware agent is a robot.

9. The software agent or hardware agent as recited in claim 7, further comprising at least one actuator, the control unit being configured to control the at least one actuator as a function of the ascertained pose of the object.

10. A non-transitory computer-readable medium on which is stored a computer program including instructions for ascertaining a pose of an object, the instructions, when executed by a computer, causing the computer to perform the following steps:
ascertaining a 3D model of the object, the 3D model including a grid of vertices;
recording a first camera image of the object from a first perspective;
recording a second camera image of the object from a second perspective, which differs from the first perspective;
ascertaining a correspondence between camera pixels of the first camera image and vertices of the 3D model;
ascertaining a correspondence between camera pixels of the second camera image and vertices of the 3D model; and
ascertaining the pose of the object from a set of poses by minimizing, across the set of poses, a loss function, the loss function for each pose being provided by:
projecting vertices of the 3D model into a respective camera image plane according to the first perspective, in the event that the 3D model is situated in the pose,
projecting vertices of the 3D model into a respective camera image plane according to the second perspective, in the event that the 3D model is situated in the pose,
calculating distance measures between the projections of the vertices projected according to the first perspective and the camera pixels of the first camera image, which are assigned to vertices projected according to the first perspective, calculating distance measures between the projections of the vertices projected according to the second perspective and the camera pixels of the second camera image, which are assigned to the vertices projected according to the second perspective, and accumulating the calculated distance measures to the loss function.

* * * * *